Sept. 18, 1928.

O. F. SHEPARD 1,684,520

CHAIN TRANSMISSION FOR ELEVATOR DEVICES

Filed Nov. 5, 1926

Inventor
Oscar F. Shepard
By Work & Work
Attorneys

Patented Sept. 18, 1928.

1,684,520

UNITED STATES PATENT OFFICE.

OSCAR F. SHEPARD, OF CINCINNATI, OHIO.

CHAIN TRANSMISSION FOR ELEVATOR DEVICES.

Application filed November 5, 1926. Serial No. 146,514.

The invention relates to chain transmission and coupling therefor for elevator devices depending upon the travel, or the position, of the elevator cab in the hatchway, for operation. Devices of such character may be a controller to stop the elevator cab at a selected floor, or landing; floor leveller to level cab with the floor, and floor indicators to designate the position of the cab in the hatchway with respect to the floors.

The operation of the controller or elevator device being relative to the position of the elevator cab in the hatchway, it has been a practice to make a transmission connection for the device with either the cab or counterweight or both. But for any method of transmitting the device it is essential that the relation between the cab and device as they operate with each other, be maintained after the device has been initially adjusted to the cab position in the hatchway, for any variation will change or displace the device, impairing the efficiency or accuracy thereof, with relation to the cab in the hatchway. The necessity for maintaining the definite relation is readily apparent when the elevator cab is to be automatically controlled as stopped or brought to a substantial level with a desired or selected floor landing or stopping point.

In this capacity it is an object of the invention to utilize a sprocket chain as the transmission means for the elevator device connecting at one end with the elevator cab and engaging with a sprocket wheel of the elevator device. The chain provides and maintains a positive relation between the driving and driven elements and is not subjected to slippage or stretch comparative to other types of transmission heretofore employed.

It is also desirable that the transmission chain be relieved of any undue load carrying strains due to its connection with the elevator cab or counter-weight and this is accomplished by providing a yielding link or coupling for the chain preferably at a point in making a coupling connection for one end of the chain.

Another object of the invention therefore is to provide a chain transmission connecting the elevator cab with an elevator device for the control or indication of the elevator cab with an extensible link or coupling for connecting one end of the chain to relieve the chain of any detrimental load carrying strains and to maintain the chain in a taut condition.

Figure 1:
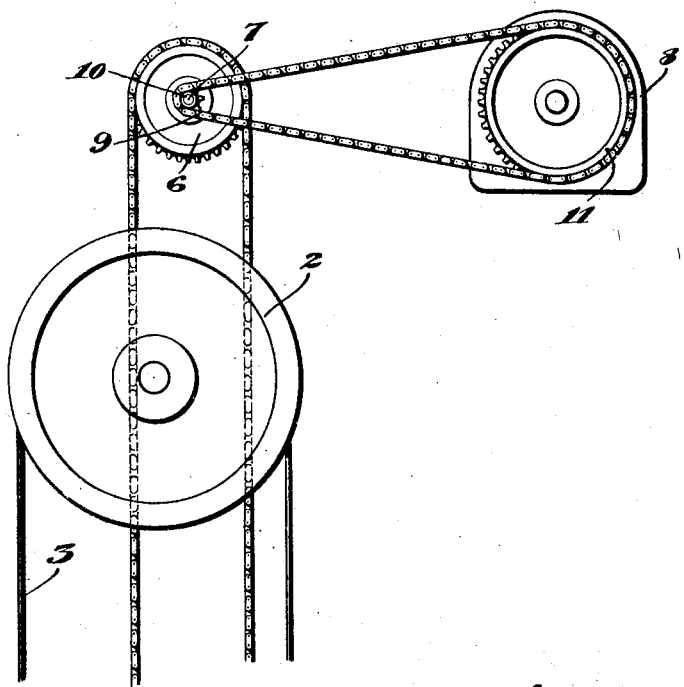

In the accompanying drawings:

Figure 1 is a view diagrammatically illustrating the invention as applied to a traction elevator, the elevator cab having a sprocket chain connecting with a sprocket wheel suitably journalled at the top of the hatchway, the sprocket wheel in turn being in transmission connection to the elevator controlling device through a second sprocket chain which intermediate connection provides a speed change means.

Figure 2:
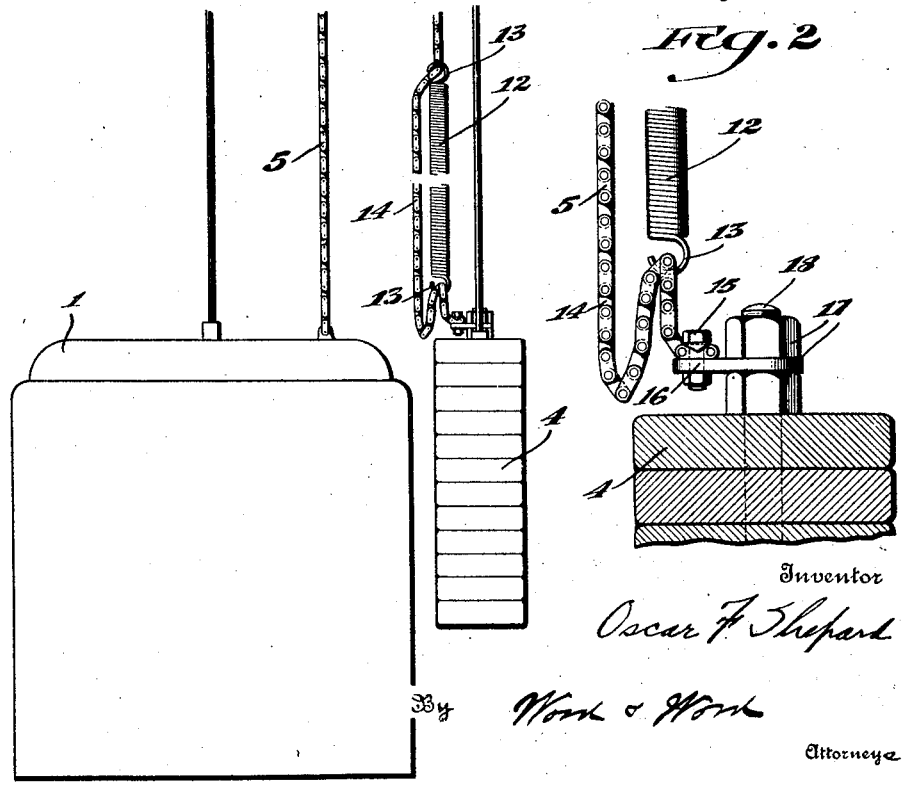

Figure 2 is an enlarged detail view of one end of the chain transmission as connecting with the counterweight through a flexible coupling or link.

Referring to the drawings, 1 indicates the elevator car which is conveyed by a sheave 2 located at the top of the hatchway through hoisting cables 3, only one cable being shown although in practice usually a number of cables are employed, having one end attached to the cab car and engaging over the driving sheave obtaining the necessary traction therewith and the other end of the cable connects with a counter-weight 4. For positively transmitting a controller in relation to the position of the car in the hatchway, a sprocket chain 5 at one end is connected to the top of the elevator car, the chain extending up in the hatchway and engaged with a sprocket wheel 6 mounted on a shaft 7 suitably journalled at the top of the hatchway. To provide for relative change in speed or modification between the sprocket wheel 6 and the controller to be driven thereby and to position the controller at an accessible position beyond the hatchway, the shaft 7 carries a second sprocket wheel 10 of reduced diameter from that of the sprocket wheel 6. This sprocket wheel 10 is engaged by an endless chain 9 which connects with a sprocket wheel 11 fixed from a shaft of the controller or elevator device 8.

A coil spring 12 constituting a flexible link is interposed between the chain links. The coil spring has its ends formed into loops 13, and hooked into the tooth engaging portions of the chain (see Figure 2). This spring is aligned with the chain length and may be adjusted to supplant as many chain links as necessary to insure a taut chain. The chain length provided primarily is of greater length than is needed and the coil spring is inserted after the chain is secured at both ends. The portion of slack chain 14 hangs loose at the side of the spring and links of it may always be called into service to lengthen the normal length of the chain by stepping the spring ends down a link of chain. The chain is attached to the counter-weight by means of a bolt 15 passed through the end link of the chain and the bolt secured to a plate 16 held between the nuts 17 on the rod 18 of the counter-weight.

Under normal movement of the elevator cab the spring is substantially in relaxed condition but yet under enough tension when adjusted to draw the chain taut. The extreme length of the chain makes it imperative to have the slack taken up at all times otherwise the device to which it is transmitting movement would not move uniformly and in synchronism with the movement of the cab. As the cables yield under the cab or counterweight load the weight of these parts tend to shift upon the chain. The chain is relieved of this undue load as the spring gives, lengthening the chain, and allowing the weight to remain on the hoisting cables.

Having described my invention, I claim:

1. In combination with an elevator mechanism including a cable hoisted elevator car, a transmission means, comprising, a length of chain having an end secured to the elevator car, as a source of movement for the transmission, and the other end of said chain suitably anchored, a sprocket engaged by said chain and rotatable on a fixed center to drive a cooperating elevator device, and an extensible link interposed in said chain for allowing the chain to lengthen as the car to which it is attached tends to shift its weight thereto due to cable stretch.

2. In combination with an elevator mechanism including a cable hoisted elevator car, a transmission means, comprising, a flexible connector secured to the elevator car and receiving movement therefrom, and the other end of said connector suitably anchored, a rotatable driven member mounted on a fixed center and engaged by said connector, and a coil spring interposed in the connector for rendering the connector extensible in the direction of load under undue stress and said spring adjustable for maintaining the correct tension in the connector.

3. In combination with an elevator mechanism including, a cable hoisted elevator car, a transmission means, comprising, a length of chain having an end secured to the elevator car for deriving movement therefrom, and the other end of said chain suitably anchored, a sprocket mounted on a fixed center and drivingly engaged by said chain, and a coil spring as a tension member interposed in the chain and supplanting a number of the links thereof, said links hanging slack and adapted to be used in the active chain length as additional length is required.

4. In combination with an elevator mechanism including, an elevator car, a transmission means, comprising, a length of chain having an end secured to the elevator car for deriving movement therefrom, and the other end suitably anchored, and a sprocket mounted on a fixed center and drivingly engaged by said chain.

5. In combination with an elevator car and elevator device including a sprocket wheel, operated in relation with the position of the car in the hatchway and in transmission connection with the car, the car driving the elevator device and the elevator device controlling the operation of the car, of a sprocket chain connecting with the car and engaging with the sprocket wheel of said elevator device providing a positive transmission for said elevator device and in relation to the position of the car in the hatchway and by which the relation is definitely maintained.

6. In combination with an elevator car and elevator device including a sprocket wheel, operated in relation with the position of the car in the hatchway and in transmission connection with the car, the car driving the elevator device and the elevator device controlling the operation of the car, of a sprocket chain connecting with the car and engaging with the sprocket wheel of said elevator device providing a positive transmission for said elevator device and in relation to the position of the car in the hatchway and by which the relation is definitely maintained, and tension means connecting with said chain.

In witness whereof, I hereunto subscribe my name.

OSCAR F. SHEPARD